United States Patent
Lu et al.

(10) Patent No.: US 10,069,821 B2
(45) Date of Patent: Sep. 4, 2018

(54) OPERATING METHOD FOR ONE-TIME PASSWORD WITH UPDATABLE SEED

(71) Applicants: Feitian Technologies Co., Ltd., Beijing (CN); Hypersecu Information Systems, Inc., Richmond (CA)

(72) Inventors: Zhou Lu, Beijing (CN); Huazhang Yu, Beijing (CN); Mingji Li, Richmond (CA)

(73) Assignees: Feitian Technologies Co., Ltd., Beijing (CN); Hypersecu Information Systems, Inc., Richmond (CA)

( * ) Notice: Subject to any disclaimer, the term of this patent is extended or adjusted under 35 U.S.C. 154(b) by 29 days.

(21) Appl. No.: 15/509,515

(22) PCT Filed: Feb. 17, 2015

(86) PCT No.: PCT/CN2015/073226
§ 371 (c)(1),
(2) Date: Mar. 8, 2017

(87) PCT Pub. No.: WO2016/065778
PCT Pub. Date: May 6, 2016

(65) Prior Publication Data
US 2017/0289141 A1   Oct. 5, 2017

(30) Foreign Application Priority Data
Oct. 28, 2014   (CN) .......................... 2014 1 0587648

(51) Int. Cl.
*H04L 29/06* (2006.01)
*G06F 21/33* (2013.01)
(Continued)

(52) U.S. Cl.
CPC ........ *H04L 63/0838* (2013.01); *G06F 21/335* (2013.01); *G06F 21/46* (2013.01);
(Continued)

(58) Field of Classification Search
None
See application file for complete search history.

(56) References Cited

U.S. PATENT DOCUMENTS 7,519,989 B2 *  4/2009  Lin ......................... G06F 21/34
                                                    713/172
8,230,496 B2    7/2012  Lu et al.
(Continued)

*Primary Examiner* — Christopher A Revak
(74) *Attorney, Agent, or Firm* — Hammer & Associates, P.C.

(57) ABSTRACT

An operating method for a one-time password with an updatable seed. The method comprises: a one-time password entering a dormancy mode after being powered on and initialized; being woken up when an interrupt is detected; entering an interrupt processing flow; setting a wakeup flag; entering a key processing flow when a key wakeup flag is set; judging a system state and a key manner; and completing the functions of programming seed data and generating a password according to a judgment result. According to the present invention, on the premise of guaranteeing the security, a user is permitted to program and update seed data in a one-time password, thereby facilitating the use of the user.

19 Claims, 5 Drawing Sheets

(51) Int. Cl.
*G06F 21/46* (2013.01)
*G09C 1/00* (2006.01)
*H04L 9/08* (2006.01)
*H04L 9/32* (2006.01)
*G06F 21/34* (2013.01)

(52) U.S. Cl.
CPC .............. *G09C 1/00* (2013.01); *H04L 9/0891* (2013.01); *H04L 9/3228* (2013.01); *H04L 9/3234* (2013.01); *H04L 63/0853* (2013.01); *G06F 21/34* (2013.01); *G06F 2221/2105* (2013.01); *H04L 63/0846* (2013.01); *H04L 2463/082* (2013.01)

(56) References Cited

U.S. PATENT DOCUMENTS

| | | | | |
|---|---|---|---|---|
| 8,996,872 | B2* | 3/2015 | Lu | H04L 9/0891 380/44 |
| 9,860,059 | B1* | 1/2018 | Duane | H04L 63/0838 |
| 2003/0212894 | A1* | 11/2003 | Buck | G06F 21/34 713/184 |
| 2008/0209224 | A1* | 8/2008 | Lord | H04L 63/083 713/185 |
| 2011/0265159 | A1* | 10/2011 | Ronda | H04L 63/0853 726/6 |
| 2011/0302646 | A1* | 12/2011 | Ronda | H04L 9/3213 726/9 |
| 2012/0233705 | A1* | 9/2012 | Boysen | G06F 21/335 726/29 |
| 2014/0189359 | A1* | 7/2014 | Marien | H04L 9/3228 713/172 |
| 2015/0228284 | A1* | 8/2015 | Lu | H04L 9/3228 704/251 |
| 2015/0256535 | A1* | 9/2015 | Abbate | G06F 9/485 726/9 |
| 2015/0310427 | A1* | 10/2015 | Yi | G06Q 20/385 705/64 |
| 2015/0365402 | A1* | 12/2015 | Woo | H04L 63/0838 726/6 |
| 2016/0241548 | A1* | 8/2016 | Kim | G06F 21/74 |
| 2017/0293751 | A1* | 10/2017 | Lu | G06F 21/34 |
| 2017/0310487 | A1* | 10/2017 | Lu | H04L 9/0618 |

* cited by examiner

OPERATING METHOD FOR ONE-TIME PASSWORD WITH UPDATABLE SEED

FIELD OF THE INVENTION

The present invention relates to a working method of a dynamic token in which a seed can be updated, which belongs to the information security field.

PRIOR ART

In prior art, OTP (One-time password) is a safe and convenient technology which prevents an account number from being pilfered. A random combination of numbers, which is unpredictable, is generated as a one-time password according to a special algorithm, and each OTP can be used only once. When the user is authenticated by a system, he or she must enter an OTP associated with an account number and a static password, and the user can get access to the system and conduct a transaction when the account number, the static password and the OTP are authenticated successfully. In this way, legitimate and uniqueness of the user can be ensured. As the most important advantage of the dynamic token, each OTP used by a user is different from another ones. Therefore, the user's identity cannot be copied by hackers. It is acknowledged that the technology of authentication via an OTP is one of the most effective ways for authenticating user's identity. The technology can protect users from exposing to online scams such as account password being stolen by hackers or Trojan, fake website, which leads to monetary and proprietary damages. At present, the OTP technology is applied in multiple fields such as E-bank, online game, telecommunication operator, E-governance and enterprise.

At present, seed data are usually installed inside dynamic tokens by token producers before the dynamic tokens leave factory. After being activated, the token cannot be updated by a user, and the token can only be used in single application.

SUMMARY OF THE INVENTION

The object of the present invention is to provide a working method of a dynamic token in which a seed can be updated, in which seed data in a dynamic token can be programmed and updated by a user without lowering down security; in this way, a user can use the dynamic token conveniently.

Thus, the present invention provides a working method of a dynamic token in which a seed can be updated, which includes:

Step S1), a dynamic token powering on and initializing, turning on a general interrupt, resetting a long-time pressing key flag, setting a system state as a third preset state, entering a suspend mode, and waiting for being waken;

Step S2), the dynamic token being waken when an interrupt is detected, entering an interrupt handling process, executing Step S3 after the interrupt handling process is finished;

the interrupt handling process includes: determining whether a key-interrupt flag is set; if yes, setting a key-waken flag, resetting the key-interrupt flag, and the interrupt handling process ending; otherwise, the interrupt handling process ending, in which, when a key of the dynamic token is pressed, a key interrupt is triggered, and the key-interrupt flag is set;

Step S3), checking, by the dynamic token, the key-waken flag, entering a key handling process in the case that the key-waken flag is set, re-entering the suspend mode when the key handling process is end, waiting for being waken, and returning to Step S2; re-entering the suspend mode in the case that the key-waken flag is not set, waiting for being waken, and returning to Step S2;

the key handing process includes:

Step A0), timing, by the dynamic token, a duration, at which the key is pressed, determining whether the duration is longer than a preset duration; if yes, setting the long-time pressing key flag, and executing Step A1; otherwise, executing Step A1 directly;

Step A1), checking, by the dynamic token, the system state, executing Step A2 in the case that the system state is the third preset state; executing Step A3 in the case that the system state is a fourth preset state; executing Step A4 in the case that the system state is a fifth preset state; executing Step A5 in the case that the system state is a sixth preset state; otherwise, executing Step A6;

Step A2), determining, by the dynamic token, whether the long-time pressing key flag is set, if yes, powering on the display screen, writing a serial number pre-stored in the dynamic token into a display buffer, setting the system state as the fourth preset state, executing Step A6; otherwise, calculating to generate an OTP according to seed data stored in the dynamic token and a dynamic factor, powering on the display screen, writing a generated OTP into the display buffer, setting the system state as the sixth preset state, and executing Step A6;

Step A3), determining, by the dynamic token, whether the long-time pressing key flag is set; if yes, setting the system state as the third preset state, powering down the display screen, and executing Step A6; otherwise, collecting light sensation data, promoting that the light sensation data is collected; determining whether a serial number in a collected light sensation data matches the serial number pre-stored in the dynamic token, if matches, storing the seed data in the collected light sensation data, prompting that the seed data is programmed successfully, setting the system state as the fifth preset state, and executing Step A6; if does not match, clearing the collected light sensation data, prompting that the seed data is programmed unsuccessfully, writing the serial number pre-stored in the dynamic token into the display buffer, setting the system state as the fourth preset state, and executing Step A6;

Step A4), calculating, by the dynamic token, to generate an OTP according to the seed data stored in the dynamic token and the dynamic factor, writing the generated OTP into the display buffer, setting the system state as the sixth preset state, and executing Step A6;

Step A5), determining, by the dynamic token, whether the long-time pressing key flag is set; if yes, writing the serial number pre-stored in the dynamic token into the display buffer, setting the system state as the fourth preset state, and executing Step A6; otherwise, setting the system state as the third preset state, and executing Step A6; and Step A6), resetting the key-waken flag, and ending the key handling process.

Preferably, in Step A3, after the light sensation data is collected, and before whether the serial number in the collected light sensation data matches the serial number pre-stored in the dynamic token is determined, the step further including: determining whether all of the light sensation data is collected, if yes, determining whether the serial number in the collected light sensation data matches the serial number pre-stored in the dynamic token; otherwise, determining whether the collection of the light sensation data is overtime, if the collection is overtime, stopping collecting the light sensation data, and prompting that the seed data is programmed overtime, writing the serial number pre-stored in the dynamic token into the display buffer, setting the system state as the fourth preset state, and executing Step A6; if the collection is not overtime, continuing to collect the light sensation data.

Preferably, in Step A3, when the duration at which the key is pressed is not longer than a preset duration, before the light sensation data is collected, the step further including: setting the system state as the first preset state; correspondingly, in the interrupt handling process, when the key flag is set, before the key-waken flag is set, the process further including: determining whether the system state is the first preset state, if yes, setting the system state as the second preset state, the interrupt handling process ending; otherwise, setting the key-waken flag; after the light sensation data is collected, and before whether the serial number in the collected light sensation data matches the serial number pre-stored in the dynamic token is determined, the step further including: determining whether all of the light sensation data is collected, if yes, determining whether the serial number in the collected light sensation data matches the serial number pre-stored in the dynamic token; otherwise, checking the system state, if the system state is the second preset state, stopping collecting the light sensation data, and prompting that programming the seed data is called off, writing the serial number pre-stored in the dynamic token into the display buffer, setting the system state as the fourth preset state, and executing Step A6; if the system state is not the second preset state, continuing to collect the light sensation data.

Preferably, in Step A3, when the serial number in the collected light sensation data matches the serial number pre-stored in the dynamic token, the step further including: storing mode information of the dynamic token in the collected light sensation data; correspondingly, that calculating to generate an OTP according to the seed data stored in the dynamic token and the dynamic factor specifically including: checking the mode information of the dynamic token stored in the dynamic token; calculating to generate an OTP according to the seed data stored in the dynamic token and an event factor in the case that the mode is an event mode; calculating to generate an OTP according to the seed data in the dynamic token and a first time factor in the case that the mode is a first time mode; calculating to generate an OTP according to the seed data stored in the dynamic token and a second time factor in the case that the mode is a second time mode.

Preferably, when the key interrupt flag is not set, the interrupt handling process further including: determining whether a RTC interrupt flag is set, if yes, setting a RTC waken flag, resetting the RTC interrupt flag, the interrupt handling process ending; otherwise, the interrupt handling process ending; in which, RTC interrupt is triggered per second, when the RTC interrupt is triggered, the RTC interrupt flag is set; correspondingly, Step S3 is replaced by: the dynamic token determining whether there exists a set waken flag, if yes, checking the RTC waken flag and the key-waken flag successively; entering the key handling process in the case that the key-waken flag is set, and executing Step S3 when the key handling process is end; entering RTC handling process in the case that the RTC-waken flag is set, executing Step S3 when the RTC handling process is end; if there is no set waken flag, the dynamic token entering suspend mode and waiting for being waken, and returning to Step S2; in which the RTC handling process includes:

Step B1), updating, by the dynamic token, the number of times of RTC interrupt, determining whether the number of times of RTC interrupt is a preset number of times, if yes, resetting the RTC-waken flag, and executing Step B2; otherwise, executing Step B2 directly;

Step B2), updating, by the dynamic token, a first parameter and a second parameter, determining whether the first parameter and the second parameter reach a corresponding threshold respectively, setting the first parameter as its initial value and updating a first time factor stored in the dynamic token in the case that the first parameter reaches the threshold of the first parameter; setting the second parameter as its initial value and updating a second time factor stored in the dynamic token in the case that the second parameter reaches the threshold of the second parameter, and executing Step B3; executing Step B3 directly in the case that both the first parameter and the second parameter do not reach the threshold;

Step B3), updating, by the dynamic token, calibration counting value, and determining whether the first parameter equals a preset value, if yes, executing Step B4; otherwise, ending the RTC handling process; and Step B4), determining, by the dynamic token, whether the first parameter and the second parameter need to be calibrated according to the calibration counting value and a calibration value pre-stored in the dynamic token, if yes, updating the first parameter, the second parameter and the calibration counting value according to the calibration value and the calibration counting value, and the RTC handling process ending; otherwise, the RTC handling process ending.

Preferably, when the serial number in the collected light sensation data matches the serial number pre-stored in the dynamic token, Step A3 further including: storing an expiry data of the seed data which is in the collected light sensation data; correspondingly, when the second parameter reaches the threshold of the second parameter, Step B2 further including: determining whether the seed data stored in the dynamic token is expired according to the expiry date of the seed data stored in the dynamic token, if yes, setting a seed data invalid flag; otherwise, updating the expiry date of the seed data stored in the dynamic token; when the duration at which the key is pressed is not longer than the preset duration, before calculating to generate an OTP according to the seed data stored in the dynamic token and the dynamic factor, Step A2 further including: checking whether the seed data invalid flag is set, if yes, prompting that the seed data is invalid, and executing Step A6; otherwise, calculating to generate an OTP according to the seed data stored in the dynamic token and the dynamic factor.

Preferably, before whether the key interrupt flag is set is determined, the interrupt handling process further including: determining whether a process-equipment communication interrupt flag is set, if yes, setting a process-equipment communication waken flag, resetting the process-equipment communication interrupt flag, and the interrupt handling process ending; otherwise, determining whether the key interrupt flag is set; in which, when communication data sent by the process-equipment is received by the dynamic token, a process-equipment communication interrupt is triggered, and the process-equipment communication interrupt flag is set; correspondingly, Step S3 is replaced by: the dynamic token determining whether there exists a set waken flag, if yes, checking the process-equipment communication waken flag and the key waken flag successively, entering a process-equipment communication handling process in the case that the process-equipment communication flag is set, and executing Step S3 when the process is end; entering the key handling process in the case that the key waken flag is set, and executing Step S3 when the process is end; the dynamic token entering a suspend mode in the case that no waken flag is set, waiting for being waken, and returning to Step S2; in which the process-equipment communication handling process includes:

Step C1), turning down the general interrupt, determining whether data received currently is a waken signal sent by the process-equipment, if yes, returning a handshake signal to the process equipment, continuing to receive communicable data sent by the process-equipment, and executing Step C2; otherwise, executing Step C3;

Step C2), determining a type of the data received currently, in the case that the data is a command of obtaining hardware information of token, obtaining a random number in the command of obtaining hardware information of token, saving the random number, and returning the random number to the process-equipment, and executing Step C3; in the case that the data is other command, decrypting a received process-equipment command according to the random number stored in the dynamic token, executing a decrypted command, and returning a result to the process-equipment, and executing Step C3; otherwise, executing Step C3; and Step C3), resetting the process-equipment communication waken flag, enabling the general interrupt, then ending the process-equipment communication handling process.

As an advantage of the present invention, a user can program and update seed data in a dynamic token without lowering down security, in this way, it is more convenient for a user to use.

BRIEF DESCRIPTION OF THE ACCOMPANYING DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described embodiments of the disclosure, other drawings obtained by those skilled in the art without any inventive work belong to the scope of the disclosure.

DETAILED DESCRIPTION OF THE INVENTION

The technical solutions in the Embodiments of the present invention are further described more clearly and completely with the drawings in the Embodiments of the present invention. Apparently, Embodiments described are just a few of all Embodiments of the present invention. On the basis of Embodiments of the invention, all other related Embodiments made by those skilled in the art without inventive work belong to the scope of the invention.

Figure 1:
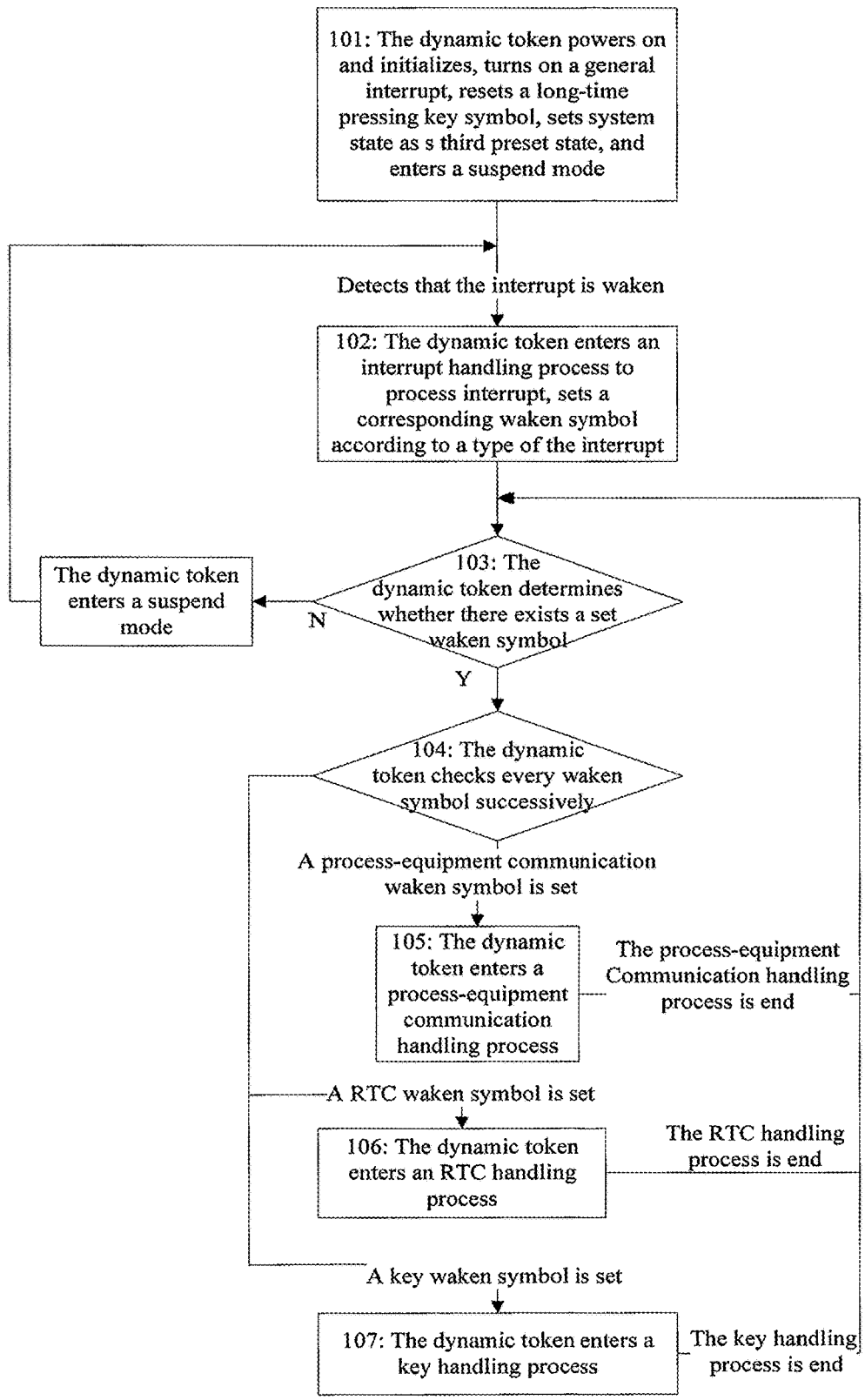
FIG. 1 illustrates a flow diagram of a working method of a dynamic token in which a seed can be updated according to the present invention.

The present invention provides a working method of a dynamic token in which a seed can be updated, as shown in FIG. 1, the method includes:

Step 101, a dynamic token powers on and initializes, turns on a general interrupt, resets a long-time pressing key flag, sets a system state as a third preset state, enters a suspend mode, the dynamic token is waken when an interrupt is detected, Step 102 is executed.

In the present embodiment 1, the interruption includes: a process-equipment communication interrupt, a RTC interrupt and a key interrupt.

Figure 2:
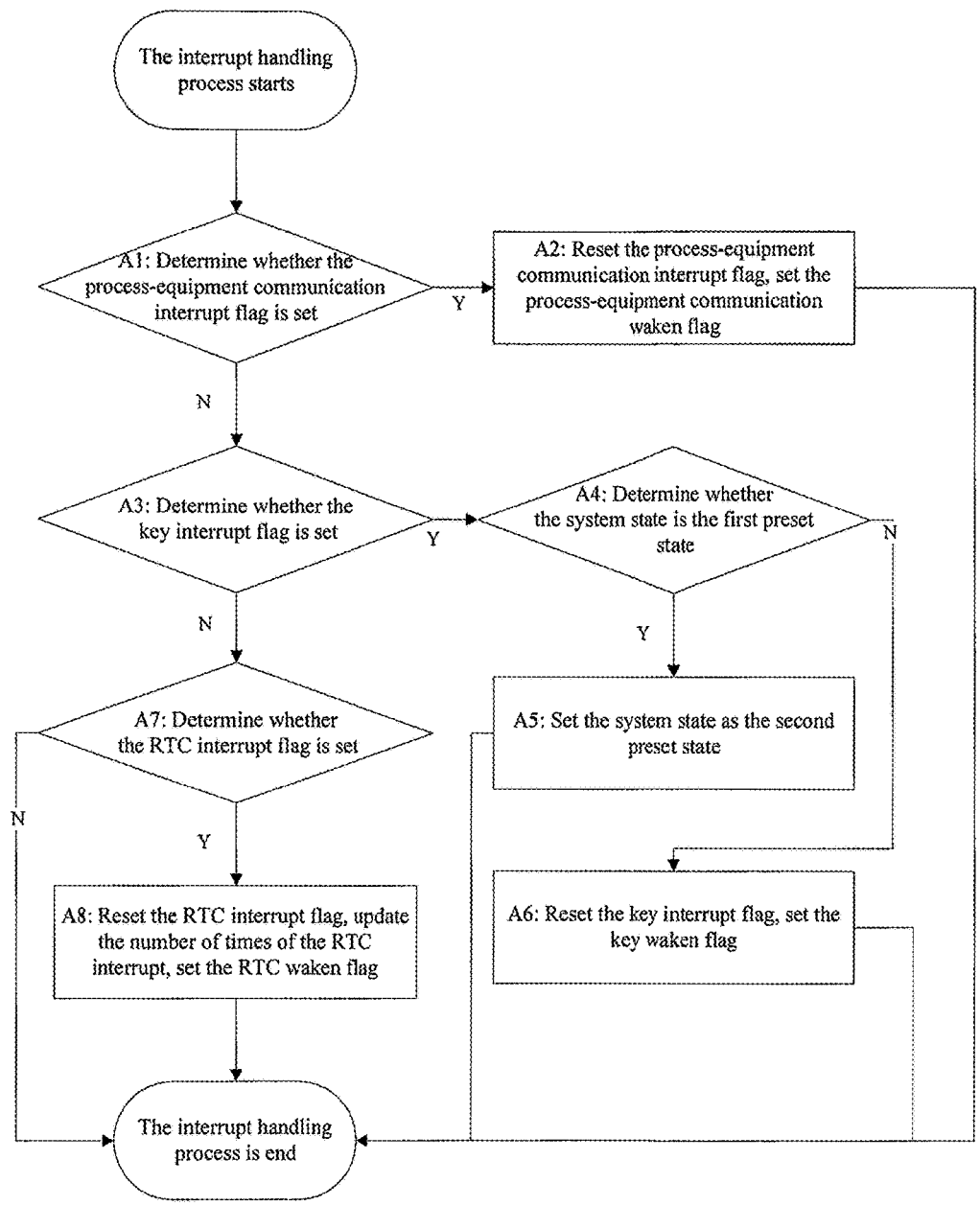
FIG. 2 illustrates a flow diagram of an interrupt handling process according to the present invention.

Step 102, the dynamic token enters an interrupt handling process to handle the interrupt, sets a corresponding waken flag according to a type of the interruption;

in the present embodiment 1, as shown in FIG. 2, the interrupt handling process specifically includes:

Step A1, determine whether a process-equipment communication interrupt flag is set, if yes, execute Step A2; otherwise, execute Step A3;

Step A2, reset the process-equipment communication interrupt flag, set a process-equipment communication waken flag, the interruption handling process is end;

Step A3, determine whether a key interrupt flag is set, if yes, execute Step A4; otherwise execute Step A7;

Step A4, determine whether the system state is a first preset state, if yes, execute Step A5; otherwise, execute Step A6;

Step A5, set the system state as a second preset state, the interrupt handling process is end;

Step A6, reset the key interrupt flag, set a key waken flag, the interrupt handling process is end;

Step A7, determine whether a RTC interrupt flag is set, if yes, execute Step A8; otherwise, the interrupt handling process is end; and Step A8, reset the RTC interrupt flag, update the number of times of the RTC interrupt, reset a RTC waken flag, the interrupt handling process is end.

In the preset embodiment 1, the communication interrupt is triggered when communication data sent by the process-equipment is received by the token, the communication interrupt flag is set; the key interrupt is triggered when the key in the token is pressed, the key interrupt flag is set; the RTC interrupt is triggered per second, when the RTC interrupt is triggered, the RTC interrupt flag is set.

In the interrupt handling process in the present embodiment 1, when the RTC interrupt flag is set, the number of times of the RTC interrupt is updated as a current number of times plus 1.

Step 103, the dynamic token determines whether there exists a set waken flag, if yes, execute Step 104; otherwise, the dynamic token enters a suspend mode, and the token is waken when an interrupt is detected, returns to Step 102;

Step 104, the dynamic token checks every waken flag successively, executes Step 105 in the case that the process-equipment communication waken flag is set; executes Step 106 in the case that the RTC waken flag is set; executes Step 107 in the case that the key waken flag is set;

In the present embodiment 1, the waken flag includes: a process-equipment communication waken flag, a RTC waken flag and a key waken flag, preferably, the dynamic token checks the process-equipment communication waken flag, the RTC waken flag and the key waken flag successively.

Figure 3:
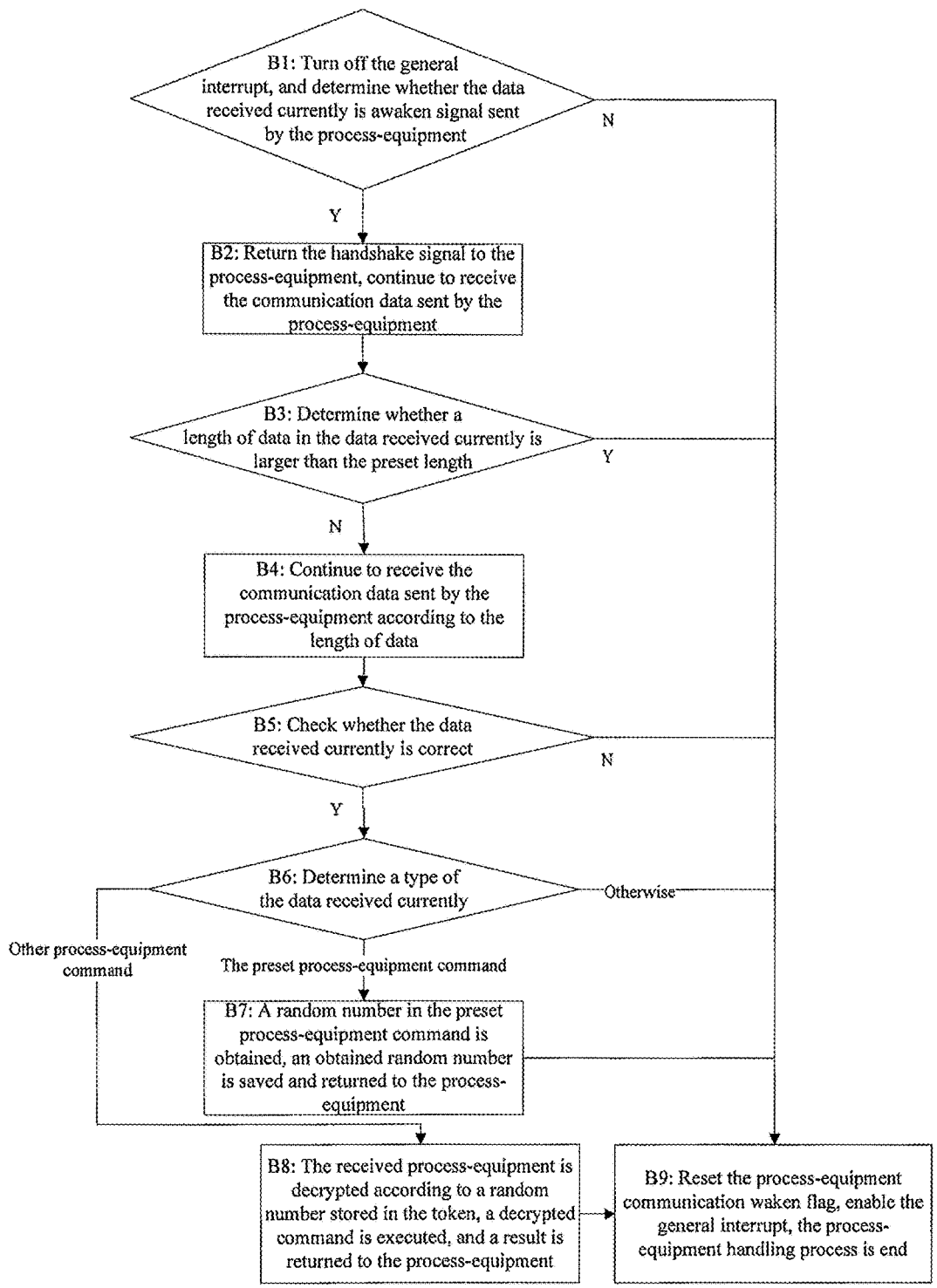
FIG. 3 illustrates a flow diagram of a process-equipment communication handling process according to the present invention.

Step 105, the dynamic token enters the process-equipment communication handling process, and returns to Step 103 when the process-equipment communication handling process is finished;

In the present embodiment 1, as shown in FIG. 3, the process-equipment communication handling process specifically includes:

Step B1, the general interrupt is turned off, whether data received currently is a waken signal sent by the process equipment is determined, if yes, Step B2 is executed; otherwise, Step B9 is executed;

Step B2, a handshake signal is returned to the process-equipment, the communication data sent by the process-equipment is received;

Step B3, determine whether a length of data in the data received currently is larger than a preset length, if yes, execute Step B9; otherwise, execute B4;

In the present embodiment 1, the preset length is 50 bytes.

Step B4, continue to receive the communication data sent by the process-equipment according to the length of data;

Step B5, check whether the data received currently is correct, if yes, execute Step B6; otherwise, execute Step B9;

Step B6, determine a type of the data received currently, execute Step B7 in the case that the data is a preset process-equipment command; execute Step B8 in the case that the data is other process-equipment command; execute Step B9 in the case that the data is not a process-equipment command;

In the present embodiment 1, the preset process-equipment command is a command of obtaining hardware information of token, which is sent by the process-equipment.

Step B7, a random number in the preset process-equipment command is obtained, an obtained random number is saved and returned to the process-equipment, Step B9 is executed;

Step B8, the received process-equipment is decrypted according to a random number stored in the token, a decrypted command is executed, and a result is returned to the process-equipment, and Step B9 is executed;

In the present embodiment 1, other process-equipment command includes a command of writing time-factor; executing a decrypted command of writing time-factor specifically includes: a time factor in the command of writing time-factor is stored, in which, the time-factor includes a first time factor and a second time factor.

Step B9, the process-equipment communication waken flag is reset, the general interrupt is enabled, and the process-equipment communication handling process is end.

Figure 4:
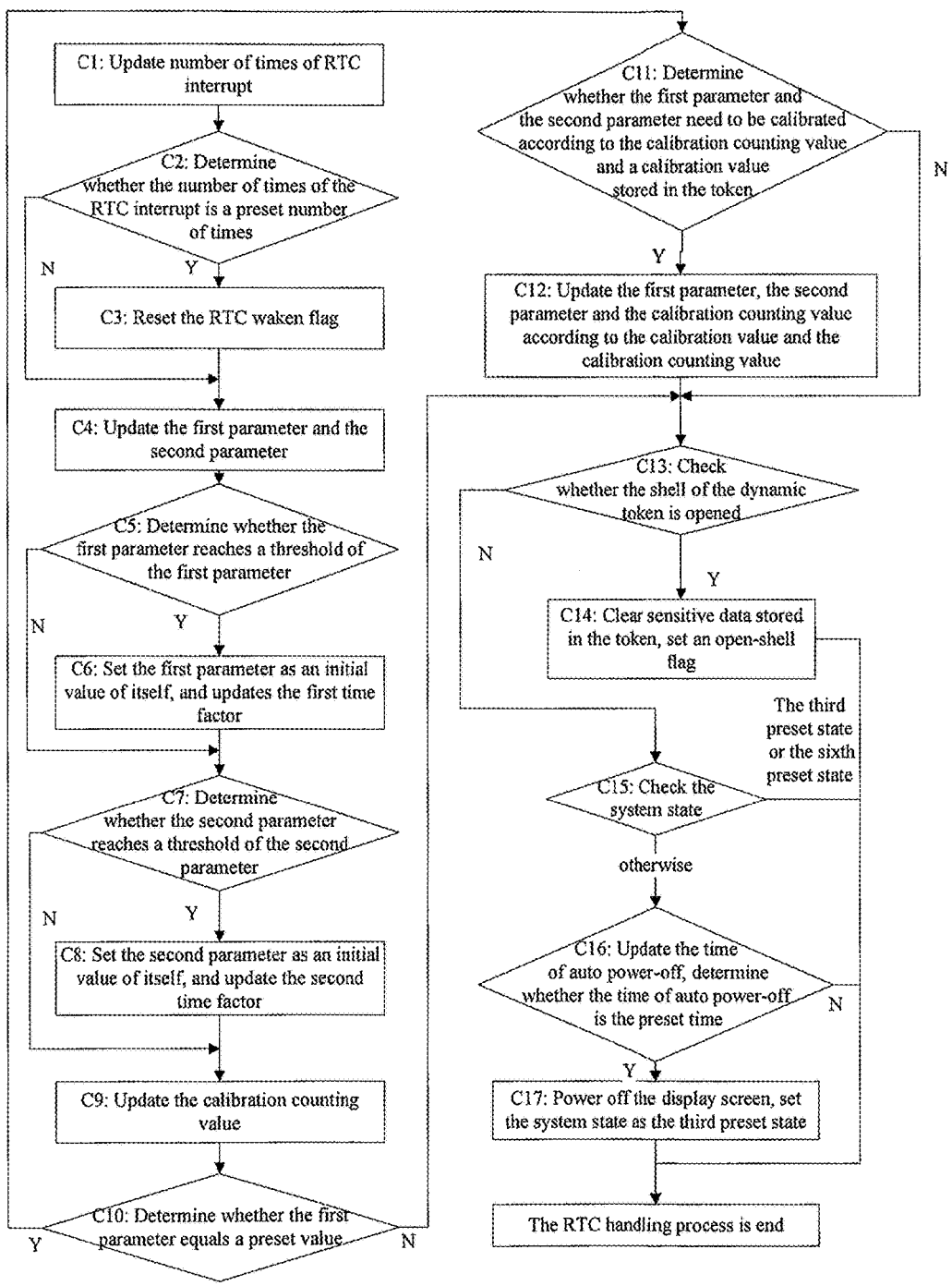
FIG. 4 illustrates a flow diagram of a RTC handling process according to the present invention.

Step 106, the dynamic token enters the RTC handling process, returns to Step 103 when the RTC handling process is finished;

In the present embodiment 1, as shown in FIG. 4, the RTC handling process specifically includes:

Step C1, the number of times of RTC interrupt is updated; in Step C1 of the present embodiment 1, updating the number of times of RTC interrupt is that the current number of times minus 1;

Step C2, determine whether a number of times of RTC interrupt is a preset number of times, if yes, execute Step C3; otherwise, execute Step C4;

in the present embodiment 1, a preset number of times is 0.

Step C3, the RTC waken flag is reset, and Step C4 is executed;

Step C4, a first parameter and a second parameter are updated;

In the present embodiment 1, both an initial value of the first parameter and an initial value of the second parameter are 0, updating the first parameter in Step C4 is that the current value of the first parameter plus 1; updating the second parameter is that the current value of the second parameter plus 1;

Step C5, determine whether the first parameter reaches a threshold of the first parameter, if yes, execute Step C6; otherwise, execute Step C7;

In the present embodiment 1, the threshold of the first parameter is 30.

Step C6, the first parameter is set as the initial value of itself, the first time factor is updated, and Step C7 is executed;

In the present embodiment 1, updating the first time factor is that a current value of the first time factor plus 1;

Step C7, determine whether the second parameter reaches a threshold of the second parameter, if yes, execute Step C8; otherwise, execute Step C9;

In the present embodiment 1, the threshold of the second parameter is 60.

Step C8, the second parameter is set as an initial value of itself, a second time factor is updated, and Step C9 is executed;

In the present embodiment 1, updating the second time factor is that the current value of the second time factor plus 1;

Step C9, a calibration counting value is updated;

In the present embodiment 1, updating the calibration counting value is that a current value of the calibration counting value plus 1;

Step C10, determines whether the first parameter equals a preset value, if yes, execute Step C11; otherwise, execute Step C13;

In the present embodiment 1, the preset value is 15;

Step C11, determine whether the first parameter and the second parameter need to be calibrated according to the calibration counting value and a calibration value stored in the token, if yes, execute Step C12; otherwise, execute Step C13;

In the present embodiment 1, Step C11 specifically includes: determine whether the calibration value &0x7F is less than the calibration counting value, if yes, the first parameter and the second parameter need to be calibrated, and Step C12 is executed; otherwise, the first parameter and the second parameter need not to be calibrated, and Step C13 is executed.

Step C12, the first parameter, the second parameter and the calibration counting value are updated according to the calibration value and the calibration counting value, and Step C13 is executed;

In the present embodiment 1, updating the calibration counting value is that the current value of the calibration counting value minus the calibration value; checks the most significant digit of the calibration, the first parameter is updated as a value which is obtained by the current value of the first parameter minus 1, and the second parameter is updated as a value which is obtained by the current value of the second parameter minus 1 in the case that the most significant digit of the calibration value is 1; in the case that the most significant digit of the calibration value is 0, the first parameter is updated as a value which is obtained by the current value of the first parameter plus 1, and the second parameter is updated as a value which is obtained by the current value of the second parameter minus 1.

Step C13, check whether a shell of the token has been opened, if yes, execute Step C14; otherwise, execute Step C15;

Step C14, sensitive data stored in the token is cleared, an open-shell flag is set, and the RTC handling process is end;

Step C15, check the system state, the RTC handling process is end in the case that the system state is a third preset state or a sixth preset state; otherwise, execute Step C16;

Step C16, time of auto power-off is updated, whether the time of auto power-off is a preset time is determined, if yes, Step C17 is executed; otherwise, the RTC handling process is end;

In the present embodiment 1, updating the time of auto power-off is that the current time minus 1, the preset time is 0;

Step C17, a display screen is powered off, the system state is set as the third preset state, the RTC handling process is end.

In the present embodiment 1, the sensitive data is data which is confidential, and may be bring security risk when the data is obtained illegally; the sensitive data includes seed data, etc.

Figure 5:
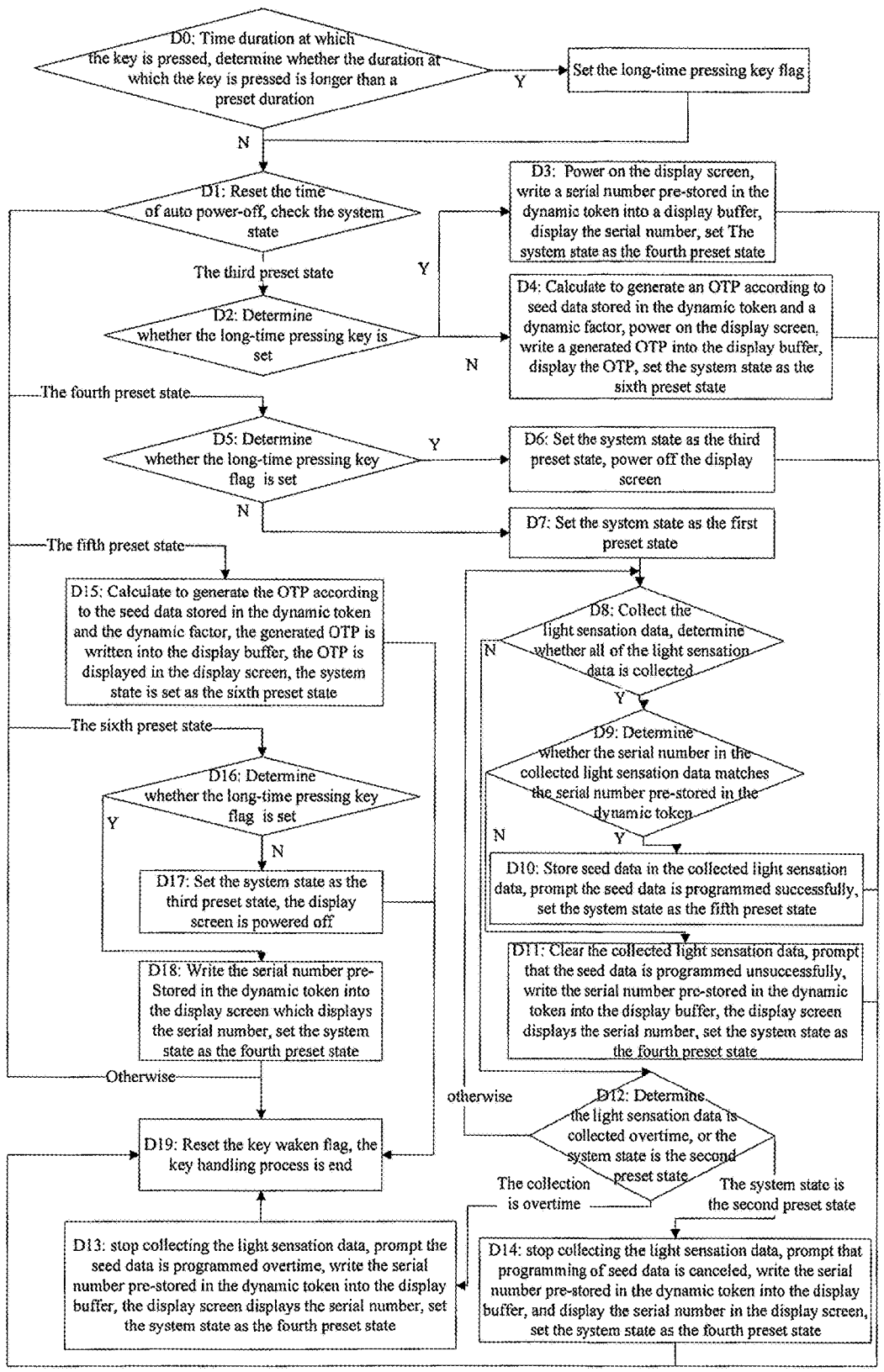
FIG. 5 illustrates a flow diagram of a key handling process according to the present invention.

Step 107, the dynamic token enters the key handling process, t and returns to Step 103 when the key handling process is end;

In the present embodiment 1, as shown in FIG. 5, the key handling process specifically includes:

Step D0, duration at which the key is pressed is timed, whether the duration at which the key is pressed is longer than a preset duration is determined, if yes, set the long-time pressing key flag, and execute Step D1; otherwise, execute Step D1;

Specifically, Step D0 includes:

Step i, a count value of a timer is initialized, the timer is turned on to time;

In the present embodiment 1, the count value of the timer is initialized as 0;

Step ii, determine whether the count value of the timer reaches a preset duration, if yes, the time at which the key is pressed is longer than the preset duration, set the long-time pressing key flag, turn off the timer, and execute Step D1; otherwise, execute Step iii;

In the present embodiment 1, the preset duration is 1 second;

Step iii, determine whether a state of the key is pressed, if yes, return to Step ii; otherwise, the duration at which the key is pressed is not longer than the preset duration, turn off the timer, and execute Step D1.

Step D1, reset the time of auto power-off, check the system state, execute Step D2 in the case that the system state is the third preset state; execute D5 in the case that the system state is a fourth preset state; execute Step D15 in the case that the system state is a fifth preset state; execute Step D16 in the case that the system state is a sixth preset state; otherwise, execute Step D19;

Step D2, determine whether the long-time pressing key flag is set, if yes, execute Step D3; otherwise, execute Step D4;

Step D3, the display screen is powered on, a serial number pre-stored in the dynamic token is written into a display buffer, the serial number is displayed by the display screen, the system state is set as the fourth preset state, and Step D19 is executed;

Step D4, calculate to generate an OTP according to seed data stored in the dynamic token and a dynamic factor, the display screen is powered on, a generated OTP is written into the display buffer, the OTP is displayed by the display screen, the system state is set as the sixth preset state, and Step D19 is executed;

Preferably, before calculating to generate the OTP, Step D4 further includes: checking whether the dynamic token has saved seed data, if yes, calculate to generate an OTP; otherwise, prompt that there is no seed data, and execute Step D19.

Step D5, determine whether the long-time pressing key flag is set, if yes, execute Step D6; otherwise, execute Step D7;

Step D6, set the system state as the third preset state, the display screen is powered off, and Step D19 is executed;

Step D7, the system state is set as the first preset state;

Step D8, the light sensation data is collected, and prompt that the light sensation data is collected, determine whether all of the light sensation data is collected, if yes, execute Step D9; otherwise, execute Step D12;

In the present embodiment 1, prompting the light sensation data is collected may include that: the information that prompt the light sensation data is collected is written into the display buffer, the information is displayed on the display screen; or a speaker is triggered, and the speaker broadcasts the information that prompt the light sensation data is collected.

Step D9, determine whether the serial number in the collected light sensation data matches the serial number pre-stored in the dynamic token, if yes, execute Step D10; otherwise, execute Step D11;

In the present embodiment 1, Step D9 may include: determining whether the serial number in the collected light sensation data is same as the serial number pre-stored in the dynamic token, if yes, execute Step D10; otherwise, execute Step D11.

Step D10, store seed data in the collected light sensation data, prompt that the seed data is programmed successfully, set the system state as the fifth preset state, and execute Step D19;

In the present embodiment 1, prompting that the seed data is programmed successfully may include that: information prompting that the seed data is programmed successfully is written into the display buffer, the information is displayed in the display screen; or the speaker is triggered, and the speaker broadcasts the information prompting the seed data is programmed successfully.

Step D11, clear the collected light sensation data, prompt that the seed data is programmed unsuccessfully, write the serial number pre-stored in the dynamic token into the display buffer, the display screen displays the serial number, set the system state as the fourth preset state, and execute Step D19;

In the present embodiment 1, prompting the seed data is programmed unsuccessfully may include: information prompting that the seed data is programmed unsuccessfully is written into the display buffer, the information is displayed in the display screen; or the speaker is triggered, and the speaker broadcasts the information prompting that the seed data is programmed unsuccessfully.

Step D12, determine whether the light sensation data is collected overtime, or whether the system state is the second preset state; execute Step D13 in the case that the light sensation data is collected overtime; execute Step D14 in the case that the system state is the second preset state; otherwise, return to Step D8;

Step D13, stop collecting the light sensation data, prompt the seed data is programmed overtime, write the serial number pre-stored in the dynamic token into the display buffer, the display screen displays the serial number, set the system state as the fourth preset state, and execute Step D19;

In the present embodiment 1, prompting the seed data is programmed overtime may include: information prompting that the seed data is programmed overtime is written into the display buffer, and the information is displayed in the display screen; or the speaker is triggered, and the speaker broadcasts the information that the seed data is programmed overtime.

Step D14, stop collecting the light sensation data, prompt that programming of seed data is canceled, the serial number pre-stored in the dynamic token is written into the display buffer, and the serial number is displayed in the display screen, the system state is set as the fourth preset state, and Step D19 is executed;

In the present embodiment 1, prompting that the seed data is programmed successfully may include: the information prompting that the seed data is programmed successfully is written into the display buffer, the information is displayed in the display screen; or the speaker is triggered, the speaker broadcasts the information prompting the seed data is programmed successfully.

Step D15, calculate to generate the OTP according to the seed data stored in the dynamic token and the dynamic factor, the generated OTP is written into the display buffer, the OTP is displayed in the display screen, the system state is set as the sixth preset state, and Step D19 is executed;

Step D16, determine whether the long-time pressing key flag is set, if yes, execute Step D18; otherwise, execute Step D17;

Step D17, the system state is set as the third preset state, the display screen is powered off, and Step D19 is executed;

Step D18, the serial number pre-stored in the dynamic token is written into the display buffered, the serial number is displayed in the display screen, the system state is displayed in the display screen, and Step D19 is executed;

Step D19, the key waken flag is reset, the key handling process is end.

Furthermore, in the present embodiment 1, the light sensation data may include: expiry date of the seed data, correspondingly, Step C8 in the RTC handling process further includes determine whether the seed data stored in the dynamic token is expired according to the expiry date of the seed data stored in the dynamic token, if yes, set a flag that seed data is invalid, and execute Step C9; otherwise, update the expiry date of the seed data stored in the dynamic token, and execute Step C9; specifically, determine whether the seed data stored in the dynamic token is expired by determining whether the expiry date of the seed data stored in the dynamic token is 0, if the expiry of date is 0, the seed data is expired; if the expiry of date is not 0, the seed data is not expired, and updating the expiry date of the seed data stored in the dynamic token is the current value of the expiry date minus 1;

in Step D2 of the key handling process, when the long-time pressing key flag is not set, before Step D4, the step further includes: check whether an invalid flag of the seed data is set, if yes, prompt that the seed data is invalid, execute Step D19; otherwise, execute Step D4; Step D10 further includes: store the expiry date of the seed data in the collected light sensation data; in which, prompting that the seed data is invalid may include: the information prompting that the seed data is invalid is written into the display buffer, the information is displayed in the display screen; or the speaker is triggered, and the speaker broadcasts the information that the seed data is invalid;

the light sensation data further includes number of bits of a displayed OTP, correspondingly, Step D10 in the key handling process further includes: store the number of bits of the displayed OTP in the collected light sensation data; writing the generated OTP into the display buffer, and display screen displaying the OTP in Step D4 and Step D15 are replaced by: intercept the generated OTP according to the number of the displayed OTP stored in the dynamic token, write intercepted data into the display buffer, the display screen displays the intercepted data; for instance, the number of bits of the displayed OTP is 6, write the last six bits of the OTP generated by intercepting into the display buffer, the display screen displays the last six bits of the generated OTP; and the light sensation data further includes mode information of the dynamic token, in which, the mode information of the dynamic token includes: an event mode, a first time mode and a second time mode, correspondingly, Step D10 in the key handling process further includes store the mode information of the dynamic token; in Step D4 and Step D15, calculating to generate the OTP according to the seed data stored in the dynamic token and the dynamic factor specifically includes: check the mode information of the dynamic token stored in the dynamic token, calculate to generate the OTP according to the seed data stored in the dynamic token and an event factor in the case that the mode information is the event mode; calculate to generate the OTP according to the seed data stored in the dynamic token and the first time factor; calculated to generate the OTP according to the seed data stored in the dynamic token and the second time factor in the case that the mode information is the second time mode; in which, when generating the OTP according to the seed data and the event factor, before or after the OTP is generated, the step further includes: update the event factor stored in the dynamic token.

While the preferred Embodiments of the present invention have been shown and described herein, any changes and substitutions will be covered by the scope of protection of the present invention.

The invention claimed is:

1. A working method of a dynamic token in which a seed can be updated, wherein the working method comprises:

Step S1), powering on and initializing of the dynamic token, turning on a general interrupt, resetting a long-time pressing key flag, setting a system state as a third preset state, entering a suspend mode, and waiting for being waken;

Step S2), waking up the dynamic token when an interrupt is detected, entering an interrupt handling process, executing Step S3 after the interrupt handling process is finished;

in which the interrupt handling process comprises: determining whether a key-interrupt flag is set; if yes, setting a key-waken flag, resetting the key-interrupt flag, and ending the interrupt handling process; otherwise, ending a key for triggering when a key of the dynamic token is pressed, and setting the key-interrupt flag;

Step S3), checking, by the dynamic token, the key-waken flag, entering a key handling process in the case that the key-waken flag is set, re-entering the suspend mode when the key handling process is ended, waiting for being waken up, and returning to Step S2; re-entering the suspend mode in the case that the key-waken flag is not set, waiting for being waken up, and returning to Step S2;

in which the key handing process comprises:

Step A0), timing, by the dynamic token, a duration at which the key is pressed, determining whether the duration is longer than a preset duration; if yes, setting the long-time pressing key flag, and executing Step A1; otherwise, executing Step A1 directly;

Step A1), checking, by the dynamic token, the system state, executing Step A2 in the case that the system state is in a third preset state; executing Step A3 in the case that the system state is in a fourth preset state; executing Step A4 in the case that the system state is in a fifth preset state; executing Step A5 in the case that the system state is in a sixth preset state; otherwise, executing Step A6;

Step A2), determining, by the dynamic token, whether the long-time pressing key flag is set, if yes, powering on the display screen, writing a serial number pre-stored in the dynamic token into a display buffer, setting the system state as the fourth preset state, executing Step A6;

otherwise, calculating to generate an OTP according to seed data stored in the dynamic token and a dynamic factor, powering on the display screen, writing the generated OTP into the display buffer, setting the system state as the sixth preset state, and executing Step A6;

Step A3), determining, by the dynamic token, whether the long-time pressing key flag is set; if yes, setting the system state as the third preset state, powering down the display screen, and executing Step A6; otherwise, collecting light sensation data, promoting that the light sensation data is being collected; determining whether a serial number in a collected light sensation data matches with the serial number pre-stored in the dynamic token, if yes, storing the seed data in the collected light sensation data, prompting that the seed data is programmed successfully, setting the system state as the fifth preset state, and executing Step A6; if no, clearing the collected light sensation data, prompting that the seed data is programmed unsuccessfully, writing the serial number pre-stored in the dynamic token into the display buffer, setting the system state as the fourth preset state, and executing Step A6;

Step A4), calculating, by the dynamic token, to generate an OTP according to the seed data stored in the dynamic token and the dynamic factor, writing the generated OTP into the display buffer, setting the system state as the sixth preset state, and executing Step A6;

Step A5), determining, by the dynamic token, whether the long-time pressing key flag is set; if yes, writing the serial number pre-stored in the dynamic token into the display buffer, setting the system state as the fourth preset state, and executing Step A6; otherwise, setting the system state as the third preset state, and executing Step A6; and Step A6), resetting the key-waken flag, and ending the key handling process.

2. The method as claimed in claim 1, wherein, Step A0 specifically comprises:

Step i), initializing, by the dynamic token, a count number of the timer, turning on the timer to count time;

Step ii), determining, by the dynamic token, whether the count number of the timer reaches the preset duration, if yes, setting the long-time pressing key flag, turning off the timer, and executing Step A1; otherwise, executing Step iii; and Step iii), determining, by the dynamic token, whether the key is pressed, if yes, returning to Step ii; otherwise, turning off the timer, and executing Step A1.

3. The method as claimed in claim 1, wherein prompting that the light sensation data is being collected specifically comprises: writing the information on prompting that the light sensation data is being collected into the display buffer, or triggering a speaker to broadcast the information on prompting that the light sensation data is being collected;

prompting that the seed data is programmed successfully specifically comprises: writing the information on prompting that the seed data is programmed successfully into the display buffer, or triggering the speaker to broadcast the information on prompting that the seed data is programmed successfully;

prompting that the seed data is programmed unsuccessfully specifically comprises: writing the information on prompting that the seed data is programmed unsuccessfully into the display buffer, or triggering the speaker to broadcast the information on prompting that the seed data is programmed unsuccessfully.

4. The method as claimed in claim 1, wherein, in Step A3, after collecting the light sensation data, and before determining whether the serial number in the collected light sensation data matches with the serial number pre-stored in the dynamic token, the step further comprises:

determining whether all of the light sensation data is collected, if yes, determining whether the serial number in the collected light sensation data matches with the serial number pre-stored in the dynamic token; otherwise, determining whether the collection of the light sensation data is overtime, if yes, stopping collecting the light sensation data, and prompting that the seed data is programmed overtime, writing the serial number pre-stored in the dynamic token into the display buffer, setting the system state as the fourth preset state, and executing Step A6; otherwise, continuing to collect the light sensation data.

5. The method as claimed in claim 4, wherein, prompting that the seed data is programmed overtime specifically comprises: writing the information on prompting the seed data is programmed overtime into the display buffer, or triggering the speaker to broadcast the information on prompting that the seed data is programmed overtime.

6. The method as claimed in claim 1, wherein, in Step A3, when the duration at which the key is pressed is not longer than a preset duration, and before the light sensation data is collected, the step further comprises: setting the system state as the first preset state;

in the interrupt handling process, when the key flag is set, and before the key-waken flag is set, the process further comprising: determining whether the system state is in the first preset state, if yes, setting the system state as the second preset state, then ending the interrupt handling process; otherwise, setting the key-waken flag;

after collecting the light sensation data, and determining before whether the serial number in the collected light sensation data matches with the serial number pre-stored in the dynamic token, the step further including: determining whether all of the light sensation data is collected, if yes, determining whether the serial number in the collected light sensation data matches with the serial number pre-stored in the dynamic token; otherwise, checking the system state, stopping collecting the light sensation data if the system state is in the second preset state, and prompting that programming of seed data is called off, writing the serial number pre-stored in the dynamic token into the display buffer, setting the system state as the fourth preset state, and executing Step A6; if the system state is not the second preset state, continuing to collect the light sensation data.

7. The method as claimed in claim 6, wherein, prompting that programming of the seed data is called off specifically comprises: writing information on prompting that the programming of the seed data is called off into the display buffer, or triggering the speaker to broadcast the information on prompting that the programming of the seed data is called off.

8. The method as claimed in claim 1, wherein, in Step A3, when the serial number in the collected light sensation data matches with the serial number pre-stored in the dynamic token, the step further comprises: storing the number of bits of the displayed OTP in the collected light sensation data;
writing the generated OTP into the display buffer is replaced with: intercepting the generated OTP according to the number of bits of the displayed OTP stored in the dynamic token, and writing the intercepted data into the display buffer.

9. The method as claimed in claim 1, wherein, in Step A3, when the serial number in the collected light sensation data matches with the serial number pre-stored in the dynamic token, the step further comprises: storing mode information of the dynamic token in the collected light sensation data; calculating to generate an OTP according to the seed data stored in the dynamic token and the dynamic factor specifically comprises: checking the mode information of the dynamic token stored in the dynamic token; calculating to generate an OTP according to the seed data stored in the dynamic token and an event factor in the case that the mode is an event mode; calculating to generate an OTP according to the seed data in the dynamic token and a first time factor in the case that the mode is a first time mode; and calculating to generate an OTP according to the seed data stored in the dynamic token and a second time factor in the case that the mode is a second time mode.

10. The method as claimed in claim 9, wherein, before or after calculating to generate the OTP according to the seed data stored in the dynamic token and the event factor, the step further comprises: updating the event factor.

11. The method as claimed in claim 9, wherein, in Step A3, when the serial number in the collected light sensation data matches with the serial number pre-stored in the dynamic token, the step further comprises: determining whether the mode information of the dynamic token in the collected light sensation data is the event mode, if not, updating the event factor stored in the dynamic token.

12. The method as claimed in claim 9, wherein, when the key interrupt flag is not set, the interrupt handling process further comprises: determining whether a RTC interrupt flag is set, if yes, setting a RTC waken flag, resetting the RTC interrupt flag, then ending the interrupt handling process; otherwise, ending the interrupt handling process; in which, the RTC interrupt is triggered per second, when the RTC interrupt is triggered, the RTC interrupt flag is set;
Step S3 is replaced with: determining, by the dynamic token, whether there exist a set waken flag, if yes, checking the RTC waken flag and the key-waken flag successively; entering the key handling process in the case that the key-waken flag is set, and executing Step S3 again when the key handling process is end; entering RTC handling process in the case that the RTC-waken flag is set, executing Step S3 again when the RTC handling process is end; if there is not any set waken flag, the dynamic token entering suspend mode and waiting for being waken, and returning to Step S2; the RTC handling process comprises:
Step B1), updating, by the dynamic token, the number of times of RTC interrupt, determining whether the number of times of RTC interrupt is a preset number of times, if yes, resetting the RTC-waken flag, and executing Step B2; otherwise, executing Step B2 directly;
Step B2), updating, by the dynamic token, a first parameter and a second parameter, determining whether the first parameter and the second parameter reach a corresponding threshold respectively, setting the first parameter as its initial value and updating a first time factor stored in the dynamic token in the case that the first parameter reaches the threshold of the first parameter; setting the second parameter as its initial value and updating a second time factor stored in the dynamic token in the case that the second parameter reaches the threshold of the second parameter, and executing Step B3; executing Step B3 directly in the case that both the first parameter and the second parameter do not reach the threshold;
Step B3), updating, by the dynamic token, calibration counting value, and determining whether the first parameter equals to a preset value, if yes, executing Step B4; otherwise, ending the RTC handling process; and
Step B4), determining, by the dynamic token, whether the first parameter and the second parameter need to be calibrated according to the calibration counting value and a calibration value pre-stored in the dynamic token, if yes, updating the first parameter, the second parameter and the calibration counting value according to the calibration value and the calibration counting value, and ending the RTC handling process; otherwise, ending the RTC handling process.

13. The method as claimed in claim 12, wherein, the RTC handling process further comprises: checking whether a shell of the dynamic token is opened, clearing sensitive data stored in the dynamic token when the shell of the dynamic token is opened, setting an open-shell flag; in which, the sensitive data comprises the seed data.

14. The method as claimed in claim 12, wherein, in Step B4, when the first parameter and the second parameter do not need to be calibrated, and after the first parameter, the second parameter and the calibration counting value are updated according to the calibration value and the calibration counting value, the step further comprises: checking the system state, ending the RTC handling process in the case that the system mode is in the third preset state or the sixth preset state; if the system state is not in the third or the sixth preset state, updating the time of auto power-off, and determining whether the time of auto power-off is the preset time, if yes, powering off the display screen, setting the system state as the third preset state, and ending the RTC handling process; otherwise, ending the RTC handling process; and
in Step A1, before the dynamic token checks the system state, the step further comprises: resetting the time of auto power-off.

15. The method as claimed in claim 12, wherein, when the serial number in the collected light sensation data matches with the serial number pre-stored in the dynamic token, Step A3 further comprises: storing an expiry date of the seed data which is in the collected light sensation data;
when the second parameter reaches the threshold of the second parameter, Step B2 further comprises: determining whether the seed data stored in the dynamic token is expired according to the expiry date of the seed data stored in the dynamic token, if yes, setting a seed data invalid flag; otherwise, updating the expiry data of the seed data stored in the dynamic token; and
when the duration at which the key is pressed is not longer than the preset duration, and before calculating to generate an OTP according to the seed data stored in the dynamic token and the dynamic factor is performed, Step A2 further comprises: checking whether the seed data invalid flag is set, if yes, prompting that the seed data is invalid, and executing Step A6; otherwise, calculating to generate an OTP according to the seed data stored in the dynamic token and the dynamic factor.

16. The method as claimed in claim 15, wherein, prompting that the seed data is invalid specifically comprises: writing information on prompting that the seed data is invalid into the display buffer, or triggering the speaker to broadcast information on prompting that the seed data is invalid.

17. The method as claimed in claim 12, wherein, determining, by the dynamic token, whether the first parameter and the second parameter need to be calibrated according to the calibration counting value and the calibration value pre-stored in the dynamic token specifically comprises: determining, by the dynamic token, whether a result obtained from collation operation between the calibration value and 0x7F is less than the calibration counting value, if yes, the first parameter and the second parameter need to be calibrated; otherwise, the first parameter and the second parameter need not to be calibrated.

18. The method as claimed in claim 17, wherein, updating the first parameter, the second parameter and the calibration counting value according to the calibration value and the calibration counting value specifically comprises: updating the calibration counting value as the current value of itself minus the calibration value, checking the most significant bit of the calibration value, updating the first parameter as a current value of the first parameter minus 1 and updating the second parameter as a current value of the second parameter minus 1 in the case that the most significant bit of the calibration value is 1; updating the first parameter as a current value of itself plus 1, and updating the second parameter as a current value of itself plus 1 in the case that the most significant bit of the calibration value is 0.

19. The method as claimed in claim 1, wherein, before determining whether the key interrupt flag is set, the interrupt handling process further comprises: determining whether a process-equipment communication interrupt flag is set, if yes, setting a process-equipment communication waken flag, resetting the process-equipment communication interrupt flag, and ending the interrupt handling process; otherwise, determining whether the key interrupt flag is set; in which, when communication data sent from the process-equipment is received by the dynamic token, a process-equipment communication interrupt is triggered, and the process-equipment communication interrupt flag is set;

Step S3 is replaced with: determining, by the dynamic token, whether there exists a set waken flag, if yes, checking the process-equipment communication waken flag and the key waken flag successively, entering a process-equipment communication handling process in the case that the process-equipment communication flag is set, and executing Step S3 again when the process-equipment communication handling process is ended; entering the key handling process in the case that the key waken flag is set, and executing Step S3 again when the key handling process is ended; the dynamic token entering a suspend mode in the case that no waken flag is set, waiting for being waken, and returning to Step S2;

the process-equipment communication handling process includes:

Step C1), turning down the general interrupt, determining whether data received currently is a waken signal sent from the process-equipment, if yes, returning a handshake signal to the process equipment, continuing to receive communicable data sent from the process-equipment, and executing Step C2; otherwise, executing Step C3;

Step C2), determining a type of the data received currently, in the case that the data is a command of obtaining hardware information of token, obtaining a random number in the command of obtaining hardware information of token, saving the random number, and returning the random number to the process-equipment, and executing Step C3; in the case that the data is other command, decrypting a received process-equipment command according to the random number stored in the dynamic token, executing a decrypted command, and returning a result to the process-equipment, and executing Step C3; otherwise, executing Step C3; and Step C3), resetting the process-equipment communication waken flag, enabling the general interrupt, then ending the process-equipment communication handling process.

* * * * *